(12) United States Patent
Ryu et al.

(10) Patent No.: US 10,178,518 B2
(45) Date of Patent: Jan. 8, 2019

(54) MOBILE TERMINAL AND METHOD FOR CONTROLLING SAME

(71) Applicant: LG ELECTRONICS INC., Seoul (KR)

(72) Inventors: Jinkuk Ryu, Seoul (KR); Taehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/543,613

(22) PCT Filed: Oct. 6, 2015

(86) PCT No.: PCT/KR2015/010535
§ 371 (c)(1),
(2) Date: Jul. 14, 2017

(87) PCT Pub. No.: WO2016/117795
PCT Pub. Date: Jul. 28, 2016

(65) Prior Publication Data
US 2017/0374537 A1    Dec. 28, 2017

(30) Foreign Application Priority Data

Jan. 22, 2015  (KR) .................. 10-2015-0010780

(51) Int. Cl.
*H04W 4/00* (2018.01)
*H04W 4/14* (2009.01)
(Continued)

(52) U.S. Cl.
CPC ............. *H04W 4/14* (2013.01); *H04M 19/04* (2013.01); *H04W 4/025* (2013.01); *H04W 4/20* (2013.01); *G06F 3/041* (2013.01)

(58) Field of Classification Search
CPC ......... H04W 4/14; H04W 4/20; H04W 4/025; G06F 3/041
(Continued)

(56) References Cited

U.S. PATENT DOCUMENTS

| 2005/0096009 | A1* | 5/2005 | Ackley ................. H04M 1/663 455/405 |
| 2010/0093370 | A1 | 4/2010 | Choi et al. |
| 2013/0017806 | A1 | 1/2013 | Sprigg et al. |

FOREIGN PATENT DOCUMENTS

| KR | 10-2011-0108300 A | 10/2011 |
| KR | 10-1104081 B1 | 1/2012 |

(Continued)

*Primary Examiner* — Amancio Gonzalez
(74) *Attorney, Agent, or Firm* — Birch, Stewart, Kolasch & Birch, LLP

(57) ABSTRACT

The present invention relates to a method for controlling a system comprising a mobile terminal for a guardian and a mobile terminal for a child. A method for controlling a mobile system comprising a first terminal and a second terminal, according to an embodiment of the present invention, comprises the steps of: transmitting a request message from the first terminal to the second terminal using a user input applied to the first terminal; determining, by the second terminal, whether the transmitted request message satisfies a preset first condition or not; processing, by the second terminal, a control command, which corresponds to the transmitted request message, on the basis of the result of determination regarding the first condition; transmitting a response message, which reflects the result of processing, from the second terminal to the first terminal; determining, by the first terminal, whether the transmitted response message satisfies a preset second condition or not; and processing, by the first terminal, a control command, which corresponds to the transmitted response message, on the basis of the result of determination regarding the second condition, (Continued)

wherein the request message and the response message use a short message service (SMS), and content of the request message and that of the response message are formed on the basis of a preset protocol.

9 Claims, 12 Drawing Sheets

(51) Int. Cl.
*H04W 4/20* (2018.01)
*H04M 19/04* (2006.01)
*H04W 4/02* (2018.01)
*G06F 3/041* (2006.01)

(58) Field of Classification Search
USPC .......................................................... 455/466
See application file for complete search history.

(56) References Cited

FOREIGN PATENT DOCUMENTS

KR   10-2014-0060793 A   5/2014
WO   WO 2013/096944 A1   6/2013

\* cited by examiner

MOBILE TERMINAL AND METHOD FOR CONTROLLING SAME

CROSS REFERENCE TO RELATED APPLICATIONS

This application is the National Phase of PCT International Application No. PCT/KR2015/010535, filed on Oct. 6, 2015, which claims priority under 35 U.S.C. 119(a) to Patent Application No. 10-2015-0010780, filed in Republic of Korea on Jan. 22, 2015, all of which are hereby expressly incorporated by reference into the present application.

TECHNICAL FIELD

The present invention relates to a method for controlling a system which includes a mobile terminal for a guardian and a mobile terminal for a child.

BACKGROUND ART

In order to implement complicated functions of such a multimedia device, new various attempts are being applied by hardware and software. For instance, provided is a user interface environment for a user to search or select functions easily and conveniently.

As a usage age of such a mobile terminal becomes lower, even an infant child uses a personal mobile terminal. Accordingly, required are enhancing a structure for a child to use a mobile terminal more conveniently, and developing a user interface.

Further, a method of controlling a system including a mobile terminal for a guardian and a mobile terminal for a child may be considered, the method capable of allowing the mobile terminal for a guardian to control the mobile terminal for a child in real time, or to search for information related to a status of the mobile terminal for a child.

DISCLOSURE OF THE INVENTION

Therefore, an object of the present invention is to provide a method of controlling a system including a mobile terminal for a child and a mobile terminal for a guardian, capable of communicating data of the mobile terminal for a child with data of the mobile terminal for a guardian without an additional server establishment.

Another object of the present invention is to provide a method of controlling a system including a mobile terminal for a child and a mobile terminal for a guardian, capable of ensuring reliability in transmitting messages between the mobile terminal for a child and the mobile terminal for a guardian.

Another object of the present invention is to provide a method of controlling a system including a mobile terminal for a child and a mobile terminal for a guardian, capable of controlling an operation of the mobile terminal for a child, by the mobile terminal for a guardian.

To achieve these and other advantages and in accordance with the purpose of the present invention, as embodied and broadly described herein, there is provided a method for controlling a mobile system including a first terminal, and a second terminal, the method comprising: transmitting a request message to the second terminal from the first terminal, based on a user input applied to the first terminal; determining whether the transmitted request message satisfies a preset first condition by the second terminal; processing a control command corresponding to the transmitted request message by the second terminal, based on a determination result with respect to the first condition; transmitting a response message reflecting a result of the processing, to the first terminal from the second terminal; determining whether the transmitted response message satisfies a preset second condition, by the first terminal; and processing a control command corresponding to the transmitted response message by the first terminal, based on a determination result with respect to the second condition, wherein the request message and the response message are formed by using a short message service (SMS), and contents of the request message and the response message are formed based on a preset protocol.

In an embodiment, the method further comprises: if the request message is transmitted from the first terminal, generating information on a status of the request message; and if the first terminal receives the response message corresponding to the transmitted request message, updating the generated information based on the contents of the response message.

In an embodiment, the determining whether the transmitted request message satisfies a preset first condition includes determining whether the first terminal is a terminal pre-registered to the second terminal, and the determining whether the transmitted response message satisfies a preset second condition includes determining whether the second terminal is a terminal pre-registered to the first terminal.

In an embodiment, the determining whether the transmitted request message satisfies a preset first condition includes determining whether a difference between a transmission time and a reception time of the request message is more than a preset time interval, and the determining whether the transmitted response message satisfies a preset second condition includes determining whether a difference between a transmission time and a reception time of the response message is more than a preset time interval.

In an embodiment, the determining whether the transmitted request message satisfies a preset first condition includes determining whether the request message is repeatedly received or not, and the determining whether the transmitted response message satisfies a preset second condition includes determining whether the response message is repeatedly received or not.

Effects of the Present Invention

In an embodiment of the present invention, can be provided a method of controlling a system including a mobile terminal for a child and a mobile terminal for a guardian, capable of communicating data of the mobile terminal for a child with data of the mobile terminal for a guardian without an additional server establishment.

In another embodiment of the present invention, reliability can be enhanced in transmitting messages between the mobile terminal for a child and the mobile terminal for a guardian.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

At least one of a mobile terminal for a guardian and a mobile terminal for a child which are included in a system according to the present invention, may correspond to a mobile terminal to be explained hereinafter.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, a digital signage and the like.

Figure 1A:
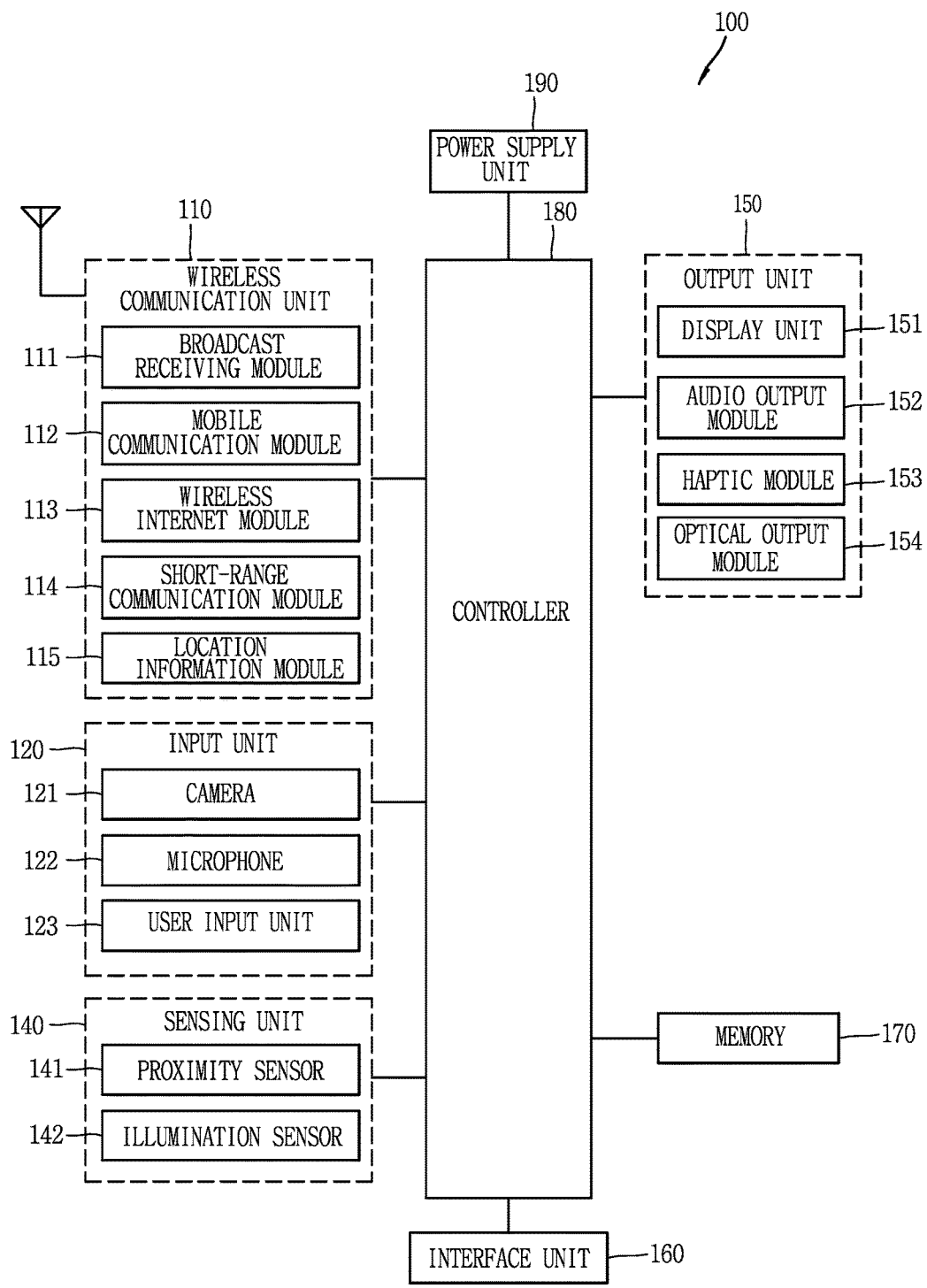
FIG. 1A is a block diagram for explaining a mobile terminal according to the present invention.
Figure 1B:
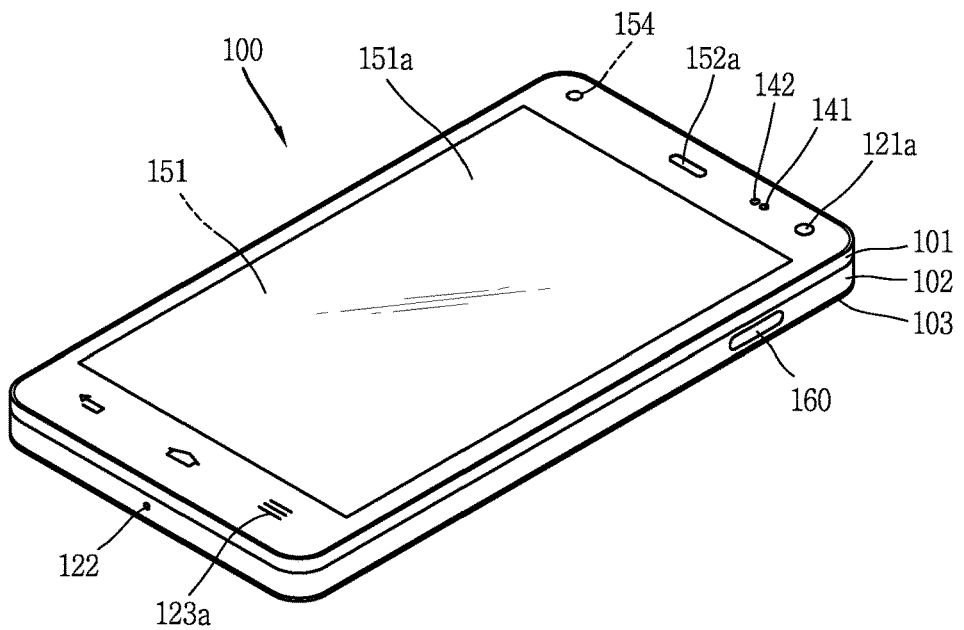
FIGS. 1B and 1C are conceptual views of a mobile terminal according to the present invention, which are viewed from different directions.
Figure 1C:
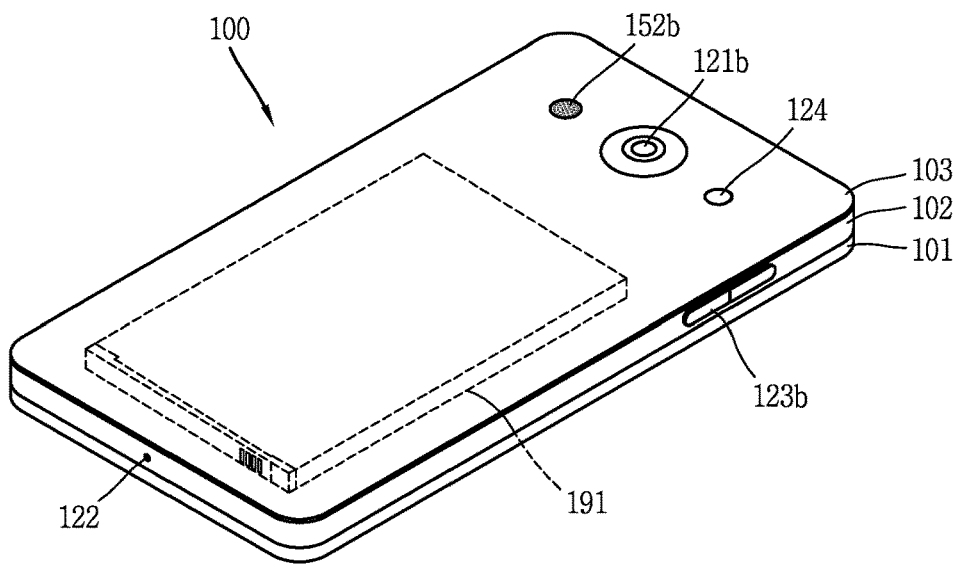

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components shown in FIG. 1A is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from at least two sensors of the sensing unit, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components, or activating application programs stored in the memory 170.

Further, the controller 180 controls some or all of the components shown in FIG. 1A in order to drive application programs stored in the memory 170. Further, in order to drive the application programs, the controller 180 may operate at least two of the components included in the mobile terminal 100 in a combined manner.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of the mobile terminal according to various embodiments to be explained later. The operation or the control method of the mobile terminal may be implemented on the mobile terminal by driving at least one application program stored in the memory 170.

Hereinafter, the above components will be explained in more detail with reference to FIG. 1A before various embodiments implemented through the aforementioned mobile terminal 100 are explained.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal 100 may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to indicate the mobile terminal 100 regarded as at least one integrated body.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first and second audio output modules 152a,152b, the proximity sensor 141, the illumination sensor 142, the optical output unit 154, the first and second cameras 121a, 121b, the first and second manipulation units 123a, 123b, the microphone 122, the interface unit 160, etc.

As shown in FIGS. 1B and 1C, the mobile terminal 100 will be explained under an assumption that the display unit 151, the first audio output module 152a, the proximity sensor 141, the illumination sensor 142, the optical output unit 154, the first camera 121a, and the first manipulation unit 123a are located on a front surface of the terminal body, the second manipulation unit 123b, the microphone 122 and the interface unit 160 are located on a side surface of the terminal body, and the second audio output module 152b and the second camera 121b are located on a rear surface of the terminal body.

However, it is to be understood that alternative arrangements are possible and within the teachings of the instant disclosure. Some components may be omitted or rearranged. For example, the first manipulation unit 123a may not be located on the front surface of the terminal body, and the second audio output module 152b may be located on the side surface of the terminal body rather than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

The drawing illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

A flash 124 is shown adjacent to the second camera 121*b*. When an image of a subject is captured with the camera 121*b*, the flash 124 may illuminate the subject.

The second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 (refer to FIG. 1A) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
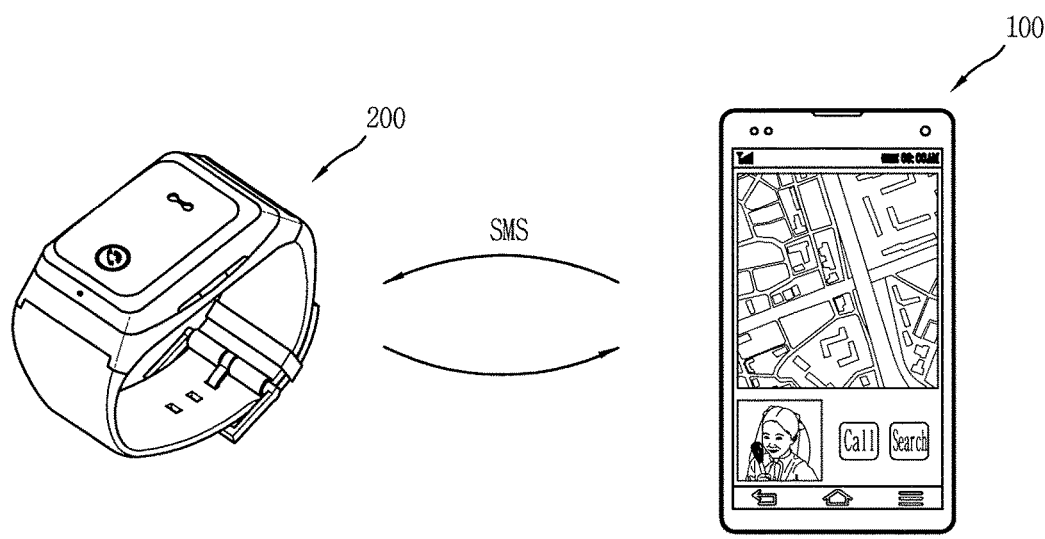
FIG. 2A is a conceptual view for explaining a system which includes a mobile terminal for a guardian and a mobile terminal for a child.
Figure 2B:
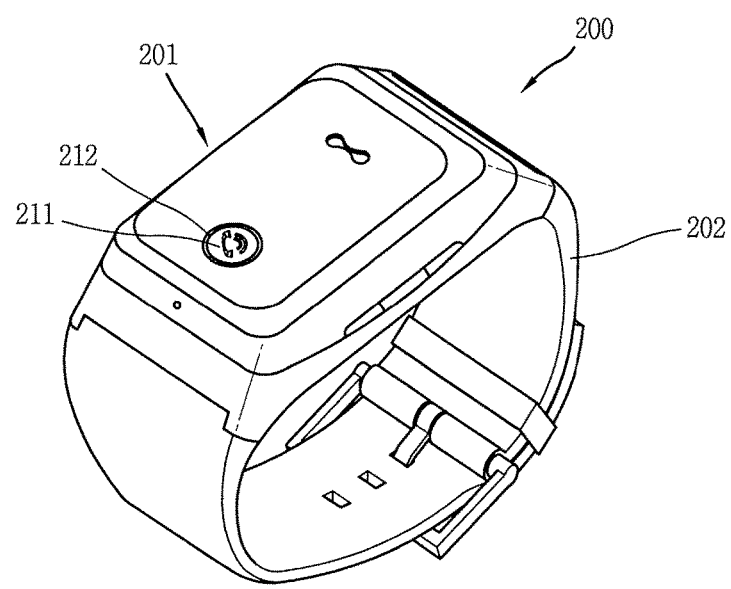
FIG. 2B is a conceptual view for explaining a structure of the mobile terminal for a child included in the system of FIG. 2A.
Figure 2C:
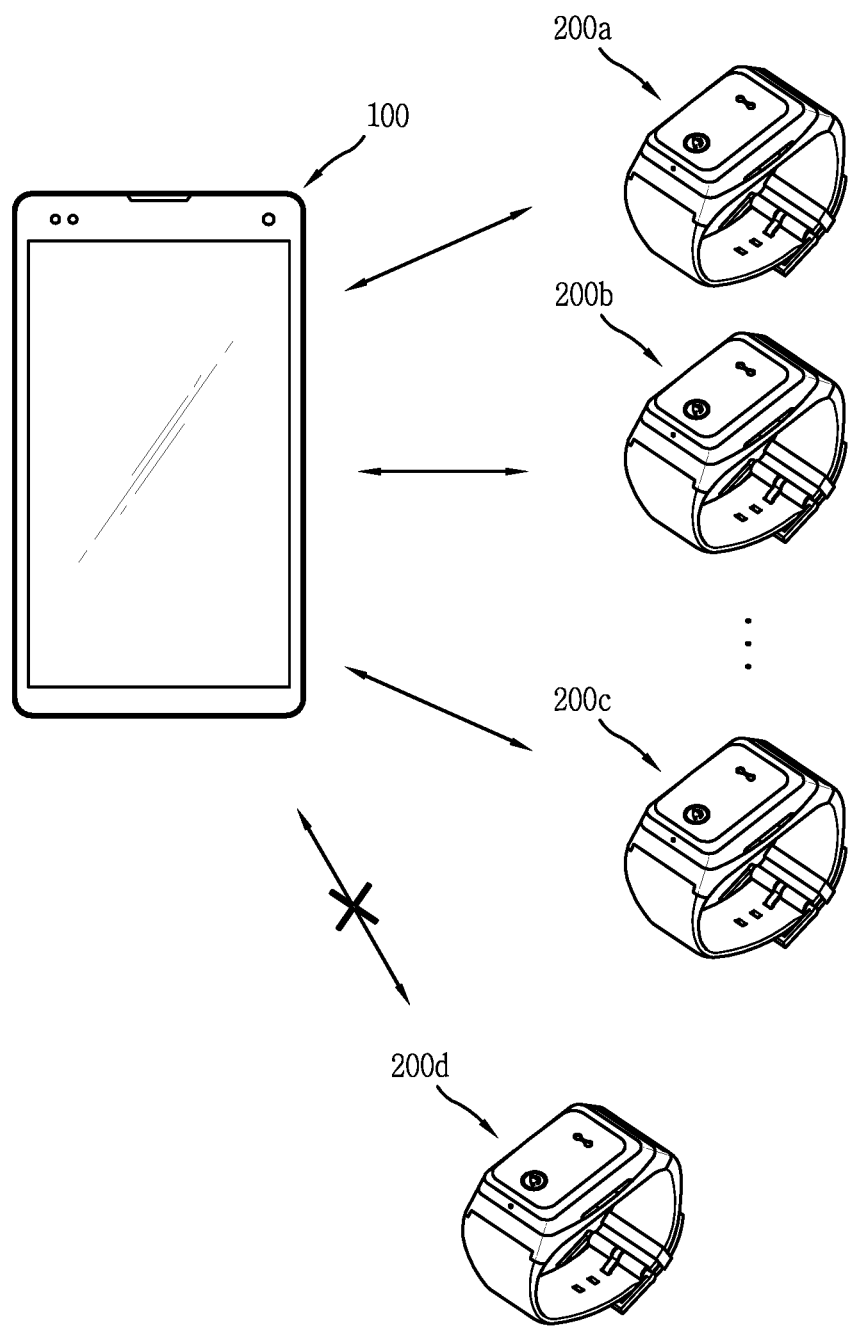
FIGS. 2C and 2D are conceptual views for explaining an embodiment of the system shown in FIG. 2A.
Figure 2D:
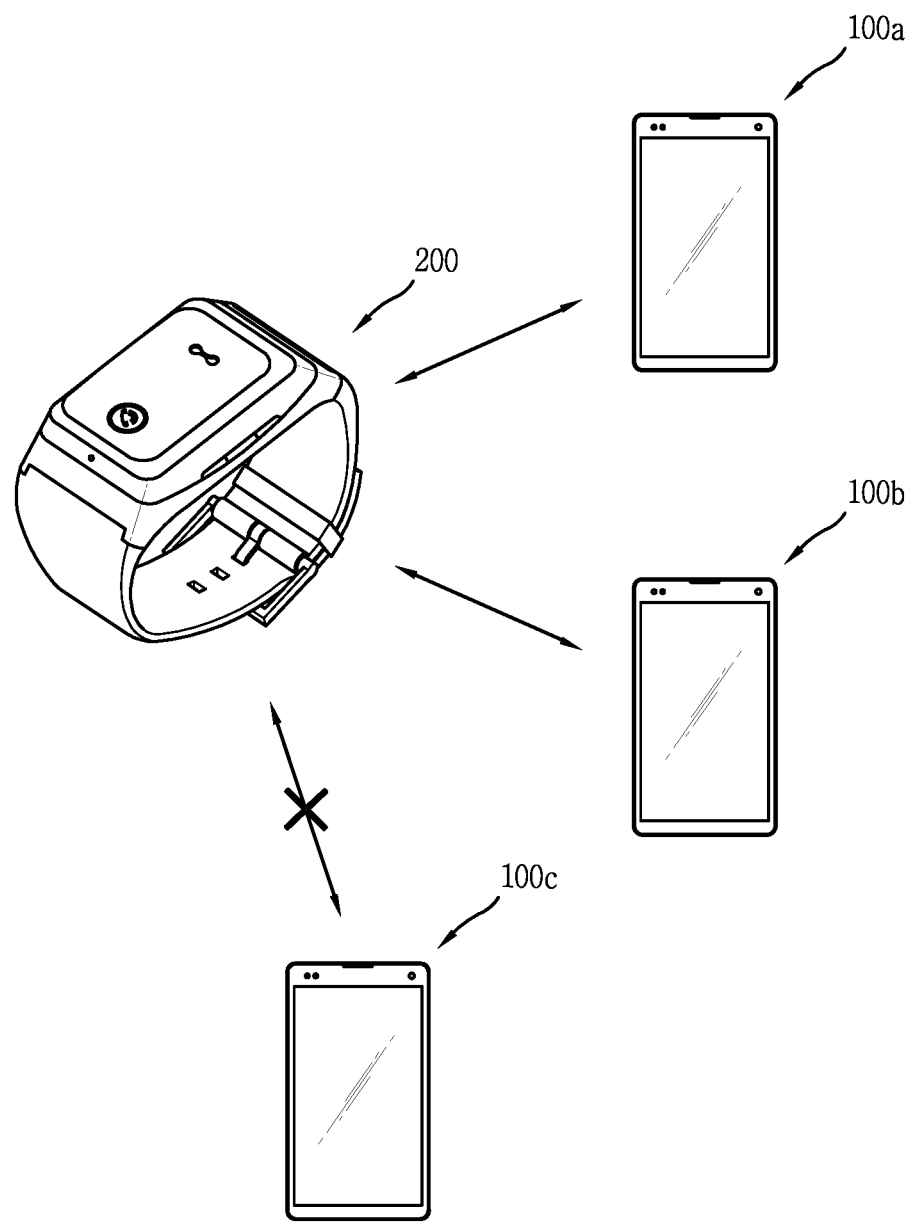

FIG. 2A is a conceptual view for explaining a system which includes a mobile terminal for a guardian and a mobile terminal for a child. FIG. 2B is a conceptual view for explaining a structure of the mobile terminal for a child included in the system of FIG. 2A. And FIGS. 2C and 2D are conceptual views for explaining an embodiment of the system shown in FIG. 2A.

Referring to FIG. 2A, the system of the present invention may include a mobile terminal for a guardian (hereinafter, will be referred to as a 'mobile terminal') 100, and a mobile terminal for a child 200. As shown in FIG. 2A, the mobile terminal 100 and the terminal for a child 200 may transceive (transmit and receive) messages with each other by using a short message service (SMS).

In the following specification, a message sent to the terminal for a child 200 from the mobile terminal 100 may be defined as a request message, and a message sent to the mobile terminal 100 from the terminal for a child 200 may be defined as a response message. The request message and the response message may form one-to-one relation. And contents of the request message and the response message may be formed based on a preset protocol. The preset protocol will be explained in more detail with reference to the following FIG. 5.

FIG. 2B is a conceptual view for explaining a structure of the terminal for a child 200 included in the system proposed in the present invention.

The terminal for a child 200 according to the present invention may be implemented as a wearable device to be explained later.

Such a wearable device may include a smart watch, a smart glass, a head mounted display (HMD), etc. Hereinafter, examples of a mobile terminal extended to such a wearable device will be explained.

Another mobile terminal (which may be configured similarly to the mobile terminal 100) may be a wearable device, which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Referring to FIG. 2B, the wearable type of terminal for a child 200 includes a terminal body 201, and a band 202 connected to the terminal body 201 to be wearable on a wrist. In general, the terminal for a child 200 may be configured to include features that are the same as or similar to those of the mobile terminal 100 of FIGS. 1A-1C. Although not shown in FIG. 2B, the terminal for a child 200 may be provided with a display unit (not shown).

The terminal body 201 may include a case having a certain appearance. As illustrated, the case may include a plurality of cases cooperatively defining an inner space for accommodating various electronic components. Other configurations are possible. For instance, a single case may alternatively be implemented, with such a case being configured to define the inner space, thereby implementing the terminal for a child 200 with a uni-body.

The terminal for a child 200 can perform wireless communication, and an antenna for the wireless communication can be installed in the terminal body 201. The antenna may extend its function using the case. For example, a case including a conductive material may be electrically connected to the antenna to extend a ground area or a radiation area.

The terminal body 201 may be provided with at least one of a button 211 and an LED 212 on a front surface thereof.

More specifically, a controller of the terminal for a child 200 may perform a call-related function based on a user input applied to the button 211. For instance, if a communication unit of the terminal for a child 200 receives a call from an external terminal, the controller of the terminal for a child 200 may perform a call receiving function corresponding to the call, based on a user input applied to the button 211. As another example, the controller of the terminal for a child 200 may perform a call sending function by sending a call to an external terminal, based on a user input applied to the button 211.

Further, the controller of the terminal for a child 200 may perform a different operation according to an input method of a user input applied to the button 211. More specifically, the input method of the user input may be related to a time interval for which the user input is maintained, a frequency (the number of times) of user inputs applied within a specific time interval, etc.

The controller of the terminal for a child 200 may perform an on/off of the LED 212. And the controller of the terminal for a child 200 may perform an output method of the LED 212. More specifically, the output method of the LED 212 may be related to an output color of the LED 212, an output time, an output pattern, etc.

Further, the controller of the terminal for a child 200 may perform the output method of the LED 212 based on information processed by the controller. More specifically, if the communication unit of the terminal for a child 200 receives a call signal, the controller may control the LED to be output based on a first output method. As another example, if a power of the terminal for a child 200 is turned on or off, the controller may control the LED to be output in a different manner.

Although not shown in FIG. 2B, a display unit may be arranged at the terminal for a child 200 in order to output information, and a touch sensor may be provided at the display unit and may be implemented as a touch screen. An audio output unit, a camera, a microphone, etc. may be provided at the terminal body 201.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the terminal body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include a fastener. The fastener may be implemented into a buckle type, a snap-fit hook structure, a Velcro® type, or the like, and include a flexible section or material. At least one of holes may be coupled to the fastener.

Each of the holes formed at the bands may be provided with a sensor for sensing a coupled state between the hole and the fastener.

For instance, the sensor provided at the hole may sense a change of a current flowing on the band 202. If the fastener formed as a conductor is coupled to at least one of the plurality of holes, the sensor may detect sense a status change of the current flowing on the band 202, thereby detecting the hole.

The band 202 may include a sensor for sensing an external force. More specifically, the sensor may sense more than a predetermined pressure applied to the band 202.

The band 202 may be provided with a band coupling portion. The band coupling portion may couple a first band and a second band of the band 202 to each other, in a state that the fastener is coupled to at least one of the plurality of holes.

More specifically, the band coupling portion may couple the first band and the second band to each other, by moving from a first position to a second position. That is, the band coupling portion may be formed to enclose the band 202, and the band coupling portion may enclose the first band and the second band by moving from the first position to the second position.

The band coupling portion may be provided with at least one sensor. For instance, the at least one sensor may be formed to sense all of a touch applied to the band coupling portion, a pressure, a motion, etc. That is, the at least one sensor may include at least one of a proximity sensor, an illumination sensor, an acceleration sensor, a motion sensor, an RGB sensor, an infrared ray sensor, a fingerprint recognition sensor, an ultrasonic sensor and an optical sensor.

The sensor provided at the band coupling portion may sense whether the band coupling portion couples the bands to each other. Further, the sensor may sense information on a user's skin surface or on an arranged status of a user's blood vein while the band coupling portion moves to couple the bands to each other. Further, the sensor may sense a moving direction of the band coupling portion. Further, the sensor may sense a user's gesture applied to the band coupling portion.

The terminal for a child 200 includes the controller 280, and the controller 280 may include features the same as or similar to those of the controller 180 shown in FIGS. 1A to 1C.

FIGS. 2C and 2D are conceptual views for explaining an embodiment of the system shown in FIG. 2A.

As shown in FIG. 2C, the mobile terminal 100 may send a request message to at least one mobile terminal for a child (200a-200c), thereby controlling the mobile terminal for a child.

More specifically, the mobile terminal 100 may send a request message to at least one pre-registered mobile terminal for a child (200a-200c), and the pre-registered mobile terminals for a child (200a-200c) receive the request message to process a specific control command corresponding to the request message.

On the other hand, as shown in FIG. 2C, even if the mobile terminal 100 sends a request message to a non-registered mobile terminal for a child 200d, the mobile terminal for a child 200d may not process a control command corresponding to the request message.

As shown in FIG. 2D, the mobile terminal for a child 200 may receive a request message from at least one mobile terminal 100a, 100b, thereby processing a predetermined control command.

More specifically, the mobile terminal for a child 200 may receive a request message from at least one pre-registered mobile terminal 100a, 100b, thereby processing a specific control command.

On the other hand, as shown in FIG. 2D, even if the mobile terminal for a child 200 receives a request message from a non-registered mobile terminal 100c, the mobile terminal for a child 200 may not process a control command corresponding to the request message.

Although not shown in FIG. 2D, each of the first mobile terminal 100a and the second mobile terminal 100b pre-registered to the mobile terminal for a child 200 may send, to the mobile terminal for a child 200, a request message for processing a different control command with respect to the mobile terminal for a child.

In the following specification, it is assumed that a system for controlling a mobile terminal for a child includes at least one mobile terminal for a guardian, and at least one mobile terminal for a child. Here, the mobile terminal for a guardian included in the system is defined as a 'first terminal', and the mobile terminal for a child included in the system is defined as a 'second terminal'. The mobile terminal for a guardian will be explained with reference to the aforementioned mobile terminal 100, and the mobile terminal for a child will be explained with reference to the aforementioned wearable type of mobile terminal 200.

Figure 3:
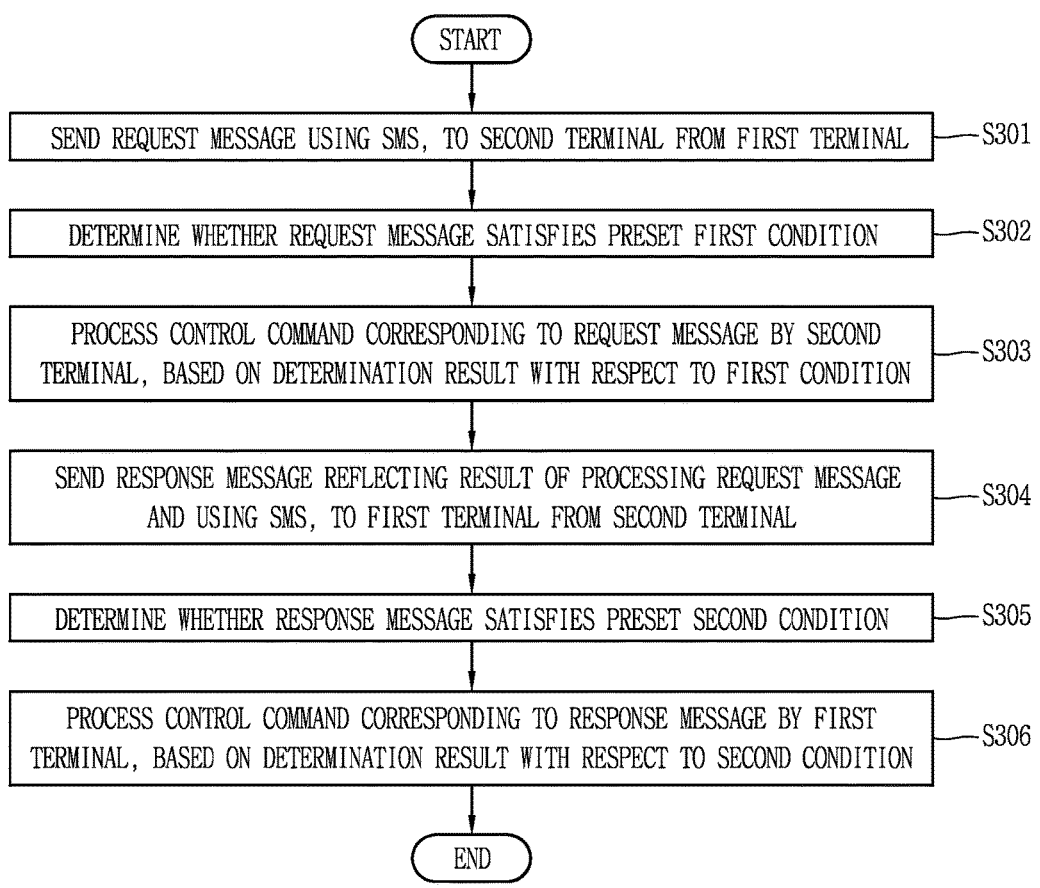
FIG. 3 is a flowchart for explaining a method for controlling the system shown in FIG. 2A.

FIG. 3 is a flowchart for explaining a method for controlling the system shown in FIG. 2A.

Referring to FIG. 3, the wireless communication unit of the first terminal may send a request message to the second terminal from the first terminal, based on a user input applied to the first terminal (S301).

More specifically, in a state that an execution screen of an application for controlling the mobile terminal for a child has been output to the display unit 151 of the first terminal, the controller 180 may send a predetermined request message to the second terminal, based on a user's touch input applied to the execution screen.

In this case, the controller 180 may form contents of the request message, based on a position where the user's touch input is applied, a touch method of the touch input, etc. Further, the controller 180 may form the contents of the request message based on a preset protocol. The preset protocol will be explained in more detail with reference to the following FIG. 5.

Once the request message is sent, the controller 180 may generate information on a status of the request message. In this case, the information on a status of the request message may include index information of the request message, information on whether the request message has been responded or not, etc. The first terminal may store therein a data structure formed by the information on a status of the request message. For instance, the data structure may be a queue or a stack.

Once a response message corresponding to the sent request message is received, the controller 180 may update the generated information based on contents of the response message.

Then, the controller 280 of the second terminal which receives the request message may determine whether the request message satisfies a preset first condition (S302).

More specifically, the preset first condition may be for determination whether the first terminal is a terminal pre-registered to the second terminal. That is, the controller 280 of the second terminal may determine whether the received request message has been sent from the pre-registered terminal for a guardian. As a result of the determination, the controller 280 of the second terminal may determine whether a control command corresponding to contents of the received request message has been processed or not.

The preset first condition may be for determination whether a difference between a transmission time and a reception time of the request message is more than a preset time interval. That is, the controller 280 of the second terminal may compare a reception time of the request message with a transmission time of the request message from the first terminal. According to whether the difference between the transmission time and the reception time of the request message is less than the preset time interval, the controller 280 may determine whether to process a control command corresponding to the contents of the received request message.

The preset first condition may be for determination whether the request message is repeatedly received or not. When receiving the request message, the controller 280 of the second terminal may generate information on the request message. In this case, the information on the request message may include index information of the received request message, information on a processed status of a control command corresponding to the received request message, etc. The controller 280 may determine whether the request message is repeatedly received or not, based on the generated information on the request message. For instance, the controller 280 may determine whether the request message is repeatedly received or not, by comparing the index information of the received request message with index information pre-generated before the request message is received.

And the controller 280 may process a control command corresponding to the transmitted request message, based on a determination result with respect to the first condition (S303).

As aforementioned, the controller 280 may determine whether to process a control command corresponding to contents of the request message, based on a determination result with respect to the first condition.

More specifically, the control command may be a command for processing setting information in order to register the first terminal which has sent the request message. For instance, if the first and second terminals have not been yet registered, the first terminal may send the request message in order to be registered as a guardian terminal of the second terminal. In this case, the first condition may be a matching state between terminal identification information included in the contents of the request message, and identification information of the second terminal which has received the request message. In this case, the terminal identification information may include information on at least one of a terminal phone number, a terminal serial number and a terminal manufacturing company.

Figure 4:
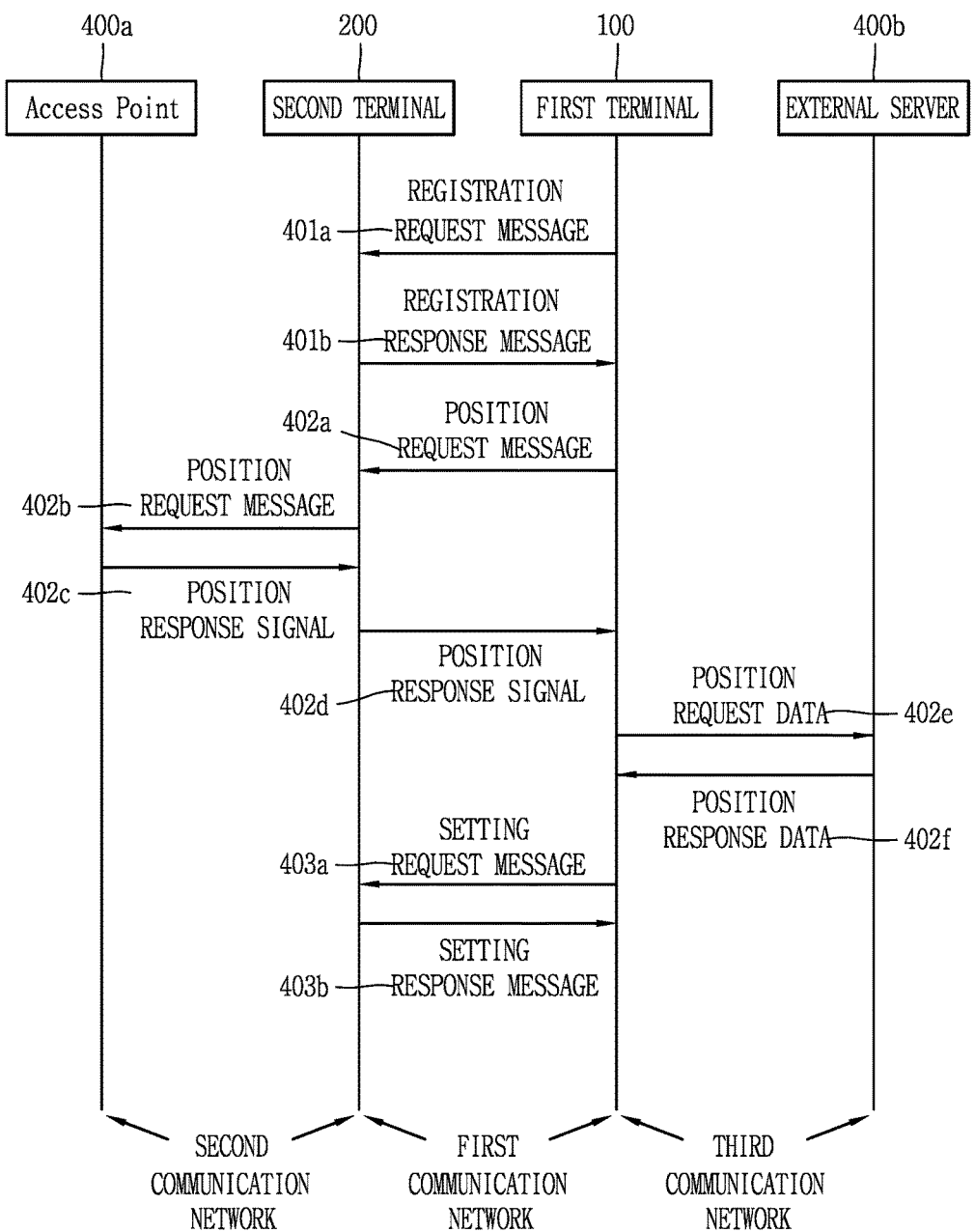
FIG. 4 is a flowchart for explaining an embodiment of the system shown in FIG. 2A.

Referring to FIG. 4, in a method for controlling a system which manages a mobile terminal including the first terminal 100 and the second terminal 200, when the first and second terminals firstly exchange messages with each other, a registration process between the first and second terminals may be performed (401a).

More specifically, the input unit of the first terminal 100 may receive the terminal identification information, and the controller 180 of the first terminal 100 may send a registration request message based on a preset protocol, by using the received identification information.

The controller of the second terminal 200 may analyze the received registration request message 401a, thereby determining whether the received identification information matches with the identification information of the second terminal 200. And the controller of the second terminal 200 may register the first terminal 100 as a guardian terminal, based on a result of the determination. That is, the controller of the second terminal 200 may process a control command for registering as a guardian terminal, based on the identification information of the first terminal 100.

In case of registering the first terminal 100 as a guardian terminal, the controller of the second terminal 200 may set information related to a control right of the first terminal. More specifically, if there exists a first guardian terminal pre-registered before the registration request message 401a is received, the controller 280 may register the first terminal as a second guardian terminal. In this case, controllable ranges of the first guardian terminal and the second guardian terminal with respect to the second terminal may be different from each other. For instance, the first guardian terminal can perform a power off control of the second terminal, whereas the second guardian terminal cannot perform the power off control of the second terminal.

Then, if it is determined that the first terminal 100 has been registered as a guardian terminal, the controller 280 of the second terminal 200 may send a registration response message 401b to the first terminal. More specifically, the controller 280 may correspond an index of the registration response message 401b to an index of the registration request message 401a. And the controller 280 may form contents of the registration response message, based on whether the first terminal 100 has been registered as a guardian terminal of the second terminal, and based on information on a control right of the first terminal with respect to the second terminal.

Once the wireless communication unit of the first terminal receives the registration response message 401b, the controller 180 may process a control command corresponding to contents of the registration response message, by using the received registration response message 401b. More specifically, the first terminal 100 may register the second terminal as a terminal to be protected. That is, the controller 180 may store the identification information of the second terminal in order to register the second terminal as a terminal to be protected, by using the registration response message. And the controller 180 may set an execution mode of an application for controlling a terminal for a child based on information related to a control right with respect to the second terminal, the application executed in the first terminal 100.

As shown in FIG. 4, after the first and second terminals are registered, the second terminal may process a specific control command based on a position request message 402a sent from the first terminal, a setting request message 403a, etc.

More specifically, when the second terminal receives the position request message 402a, the controller 280 of the second terminal sends a position request signal to an access point 400a positioned at a predetermined distance from a body of the second terminal. And the controller 280 may receive a position response signal from the access point 400a.

For instance, the access point may include a wireless AP, a base station assigned with a specific cell, a GPS satellite, etc. And the position response signal may include GPS coordinates information, cell ID information, AP MAC address information, etc.

A wireless communication unit of the second terminal may send, to the first terminal, a response message reflecting a result of the processing (S304).

More specifically, the wireless communication unit of the second terminal may send, to the first terminal, a position response message 402d, by using the received position response signal 402c. The second terminal 200 may convert information included in the position response signal into a preset protocol, and may include the converted information in the position response message.

The controller 180 of the first terminal may determine whether the transmitted response message satisfies a preset second condition (S305).

More specifically, the second condition may be for determination whether the second terminal which has sent the response message has been pre-registered to the first terminal. For instance, the controller of the first terminal may determine whether the terminal which has sent the response message has been pre-registered to the first terminal, based on information related to a transmission subject and included in the transmitted response message.

Further, the controller 180 may process a control command corresponding to the response message, based on a determination result with respect to the second condition (S306).

More specifically, when the position response message from the second terminal is received, the controller 180 of the first terminal may send position request data 402e to an external server 400b. In this case, the external server 400b may be a geographic information system (GIS) server which provides a map image corresponding to location information, address information, etc. After sending the position request data to the external server 400b, the first terminal may receive position response data 402f from the external server. For instance, when the external server is a GIS server, the position response data may include a map image corresponding to the position request data, address information, etc.

As shown in FIG. 4, the first terminal 100 may send, to the second terminal 200, the registration request message 401a including terminal identification information. The terminal identification information may include a terminal phone number, a terminal serial number, etc.

If the terminal identification information corresponds to identification information of the second terminal, the controller of the second terminal may store the identification information of the first terminal which has sent the registration request message. And the second terminal may send, to the first terminal, a registration response message, by reflecting a processing result with respect to the registration response message.

As a result, the first terminal may receive the registration response message, thereby determining whether a registration request with respect to the second terminal has been successful or not. If it is determined that the registration request has been successful, the controller of the first terminal may store therein the identification information of the second terminal.

If the first and second terminals have been registered, the first terminal may send a request message to the second terminal. For instance, the request message may be a message for acquiring position information of the second terminal. As another example, the request message may be a message for processing a predetermined control command by the second terminal. In this case, the predetermined control command may include at least one of a command to send information on a battery remaining amount of the second terminal to the first terminal, a command to deactivate a call sending function of the second terminal, a command to control a volume of the second terminal, a command to activate or deactivate a button touch sound of the second terminal, and a command to turn off a power of the second terminal.

In case of receiving position information of the second terminal from the second terminal, the first terminal may acquire at least one of a map image corresponding to the position information and address information, from the external server 400*b*.

Figure 5:
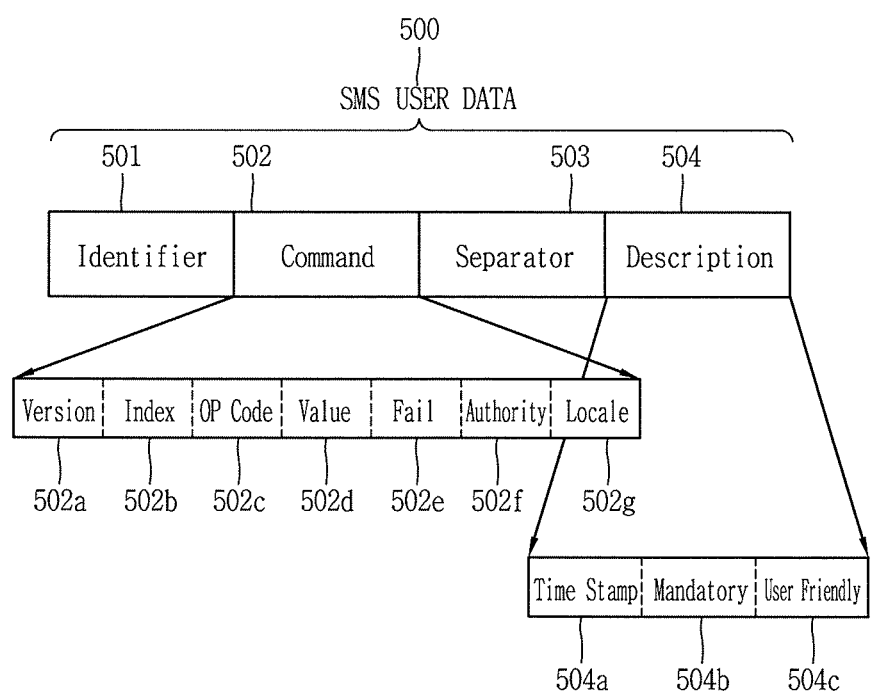
FIG. 5 is a conceptual view for explaining a protocol which forms contents of a request message and a response message according to the present invention.

FIG. 5 is a conceptual view for explaining a protocol which forms contents of a request message and a response message according to the present invention.

As shown in FIG. 4, the first terminal may send request messages 401*a*, 402*a*, 403*a* to the second terminal, or may receive response messages 401*b*, 402*d*, 403*b* from the second terminal. In this case, the request messages and the response messages may be formed by using a short message service (SMS). And contents of the request messages and the response messages may be formed based on a preset protocol.

That is, as shown in FIG. 5, the contents 500 of the request messages and the response messages may be formed based on a preset protocol.

Referring to FIG. 5, the protocol may include at least one of an identifier field 501, a command field 502, a separator field 503 and a description field 504. More specifically, as shown in FIG. 5, the command field 502 may include version information 502*a* of a protocol, index information 502*b*, first control command information 502*c*, second control command information 502*d*, fail information 502*e*, authority information 502*f*, etc.

Further, the description field 504 may include at least one of information 504*a* on a message transmission time, text information 504 corresponding to a first control command, and text information 504*c* corresponding to a second control command.

Figure 6A:
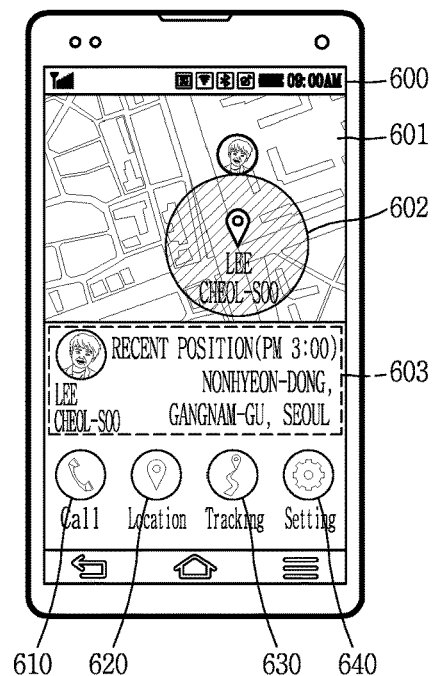
FIGS. 6A to 6C are conceptual views for explaining an embodiment of a mobile terminal for a guardian according to the present invention.
Figure 6B:
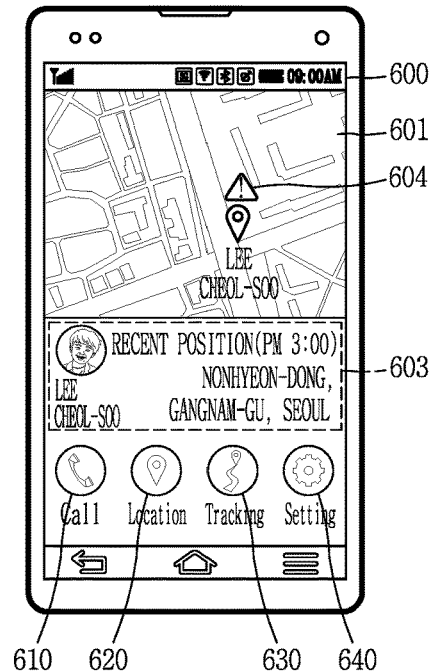
Figure 6C:
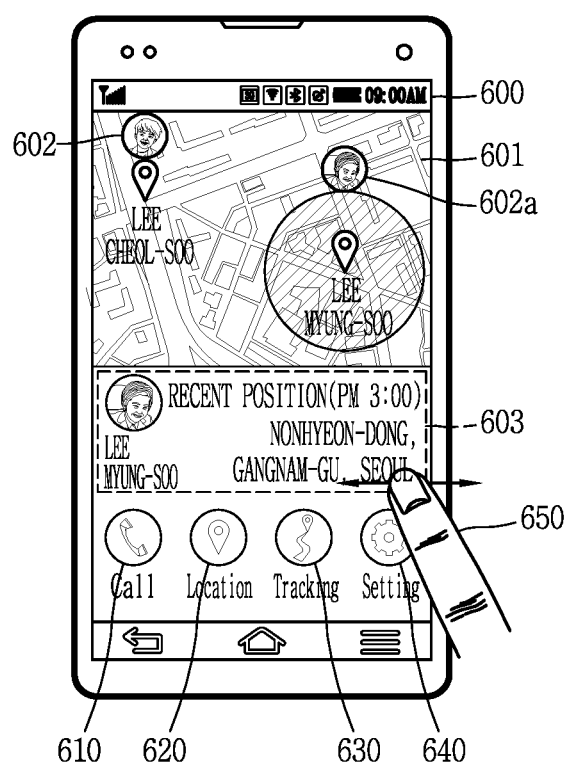

FIGS. 6A to 6C explain an embodiment of a terminal for a guardian according to the present invention.

As shown in FIG. 6A, the display unit of the first terminal, i.e., a terminal for a guardian, may output an execution screen 600 of an application for controlling a terminal for a child. The execution screen 600 may include at least one of a graphic object 602 related to a position of the pre-registered second terminal (a terminal for a child), text information 603 related to a position of the second terminal, and button images 610, 620, 630, 640 related to a control command of the second terminal. And the execution screen 600 may include a map image 601 related to a current position of the second terminal.

The controller 180 of the first terminal may execute a function related to the second terminal, based on a user input (not shown) applied to the button images 610, 620, 630 output to the execution screen 600.

For instance, when a user input is applied to the first button image 610, the controller 180 may execute a call sending function to the second terminal pre-registered to the first terminal. As another example, when a user input is applied to the second button image 620, the controller 180 may send a position request message to the second terminal. As still another example, when a user input is applied to the third button image 630, the controller 180 may output, to the execution screen 600, information related to a moving path of the second terminal. When a user input is applied to the fourth button image 640, the controller 180 may convert the output execution screen 600 into a setting screen of the application (refer to FIG. 7A).

Referring to FIG. 6B, if position information of the second terminal has not been received for a predetermined time interval, the controller 180 of the first terminal may output an alert image 604 to the execution screen 600.

Referring to FIG. 6C, illustrated is an embodiment related to a case where a plurality of second terminals are pre-registered to the first terminal. More specifically, the execution screen 600 may include a first graphic object 602 and a second graphic object 602*a* related to positions of the plurality of second terminals. The controller 180 of the first terminal may select one of the plurality of second terminals, based on a user input 650 applied to the execution screen 600. In this case, the controller 180 of the first terminal may change the appearance of the graphic object 602*a* related to a position of the selected second terminal.

Figure 7A:
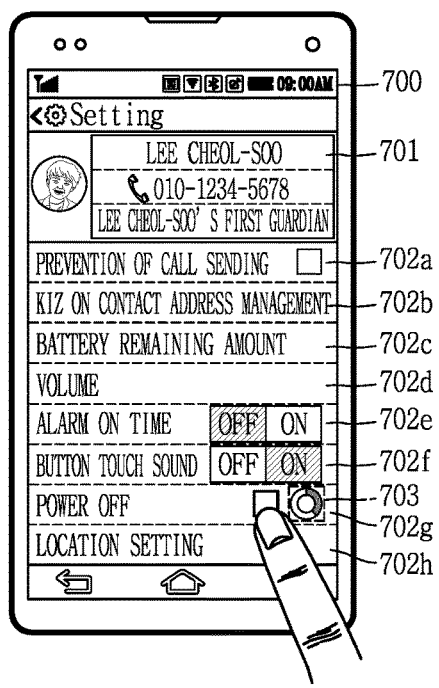
FIGS. 7A and 7B are conceptual views for explaining an embodiment of a mobile terminal for a guardian according to the present invention.
Figure 7B:
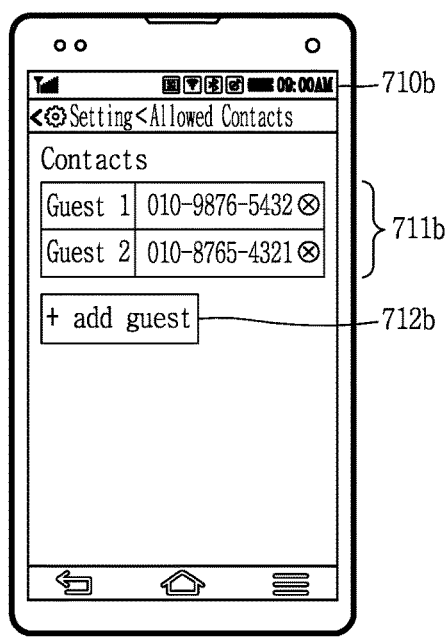

FIGS. 7A and 7B explain an embodiment of a terminal for a guardian according to the present invention.

As shown in FIG. 7A, a setting screen 700 may include identification information 701 of a second terminal pre-registered to a first terminal, and a menu image related to a control command with respect to the second terminal.

More specifically, the identification information 701 may include a user name of the second terminal, a phone number, a protection level (grade), etc. Further, the controller 180 of the first terminal may send a request message such that a preset control command may be processed by the second terminal, based on a user input applied to the menu image.

And the controller 180 may set information related to a call receiving function of the pre-registered second terminal, based on a user input applied to the setting screen 700.

Referring to FIG. 7B, the controller 180 may convert the output setting screen 700 into a second setting screen 710*b* for setting information related to a call receiving function of the second terminal, based on a user input applied to the setting screen 700.

As shown in FIG. 7B, the second setting screen 710*b* may include a list 711*b* related to the second terminal pre-registered to the first terminal. For instance, the second setting screen 710*b* may include a list of phone numbers which can be received by the second terminal. Further, the second setting screen 710b may include a graphic object 712b for adding a new phone number to the list. The controller 180 may add or change a phone number which can be received by the second terminal, based on a user input applied to the graphic object 712b.

Figure 8A:
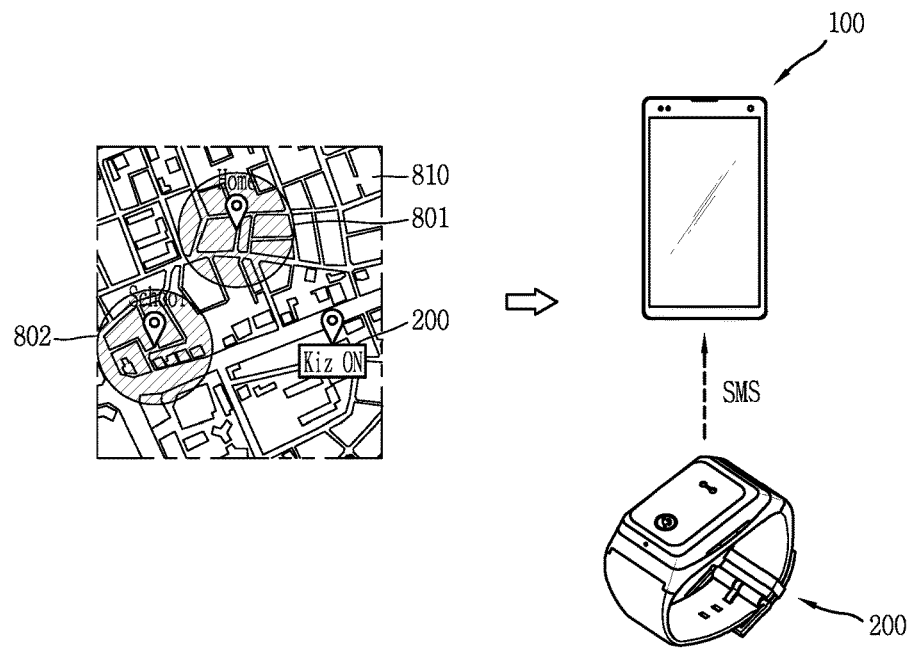
FIGS. 8A and 8B are conceptual views for explaining an embodiment to send specific data to a terminal for a guardian from a mobile terminal for a child according to the present invention.
Figure 8B:
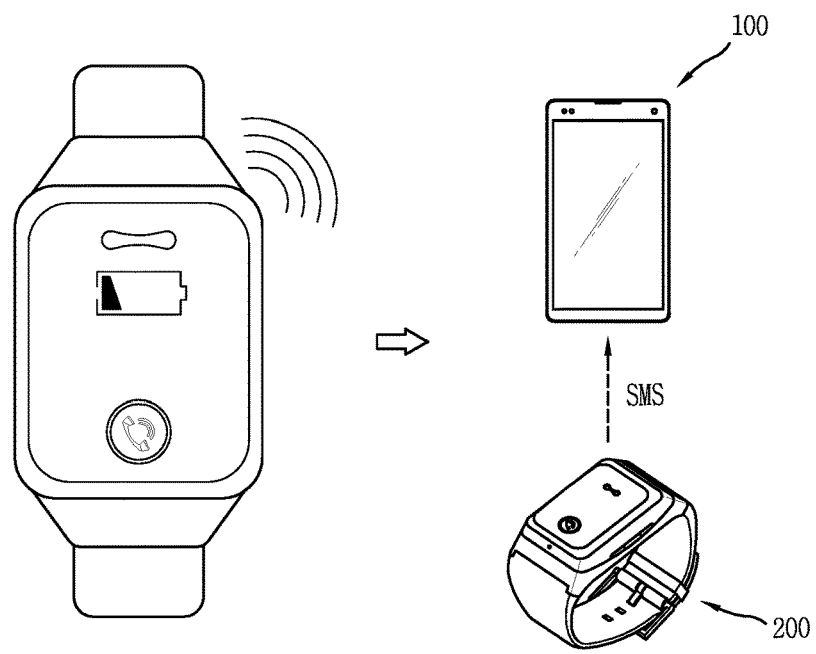

FIGS. 8A and 8B explain an embodiment to send specific data to a terminal for a guardian from a mobile terminal for a child according to the present invention.

As shown in FIG. 8A, the controller of the second terminal may send a predetermined message to the first terminal, if the second terminal moves to an area out of a preset area. More specifically, the controller of the first terminal may set a specific area based on a user input applied to the setting screen 700. For instance, the controller 180 may set a plurality of areas 801, 802. When moving to a region rather than the set areas, the second terminal may send, to the first terminal, a short message including position information of the second terminal.

As shown in FIG. 8B, a battery remaining amount of the second terminal is reduced to less than a predetermined level, the second terminal may send, to the first terminal, a short message including information related to the battery remaining amount of the second terminal.

In the present invention, a new type of user convenience may be provided, since a user authentication of a wearable type of mobile terminal is performed by using the band.

Further, as the length of the band portion is changed, a user of the wearable type of mobile terminal may be informed of occurrence of an event. This may allow the user to sense new type of notification information from the mobile terminal.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for controlling a mobile system including a first terminal and a second terminal, the method comprising:
transmitting a request message to the second terminal from the first terminal, based on a user input applied to the first terminal;
determining whether the transmitted request message satisfies a preset first condition by the second terminal;
processing a control command corresponding to the transmitted request message by the second terminal, based on a determination result with respect to the first condition;
transmitting a response message reflecting a result of the processing, to the first terminal from the second terminal;
determining whether the transmitted response message satisfies a preset second condition, by the first terminal; and
processing a control command corresponding to the transmitted response message by the first terminal, based on a determination result with respect to the second condition,
wherein the request message and the response message are formed by using a short message service (SMS), and contents of the request message and the response message are formed based on a preset protocol; and
wherein the method further comprises:
if the request message is transmitted from the first terminal, generating information on a status of the request message; and
if the first terminal receives the response message corresponding to the transmitted request message, updating the generated information based on the contents of the response message.

2. The method of claim 1, wherein the information on a status of the request message includes at least one of index information of the request message, and information on whether the request message has been responded or not.

3. The method of claim 2, further comprising storing a data structure formed by the information on a status of the request message, by the first terminal.

4. The method of claim 3, wherein the data structure is a queue or a stack.

5. The method of claim 1, wherein the determining whether the transmitted request message satisfies the preset first condition includes determining whether the first terminal is a terminal pre-registered to the second terminal, and
wherein the determining whether the transmitted response message satisfies the preset second condition includes determining whether the second terminal is a terminal pre-registered to the first terminal.

6. The method of claim 1, wherein the determining whether the transmitted request message satisfies the preset first condition includes determining whether a difference between a transmission time and a reception time of the request message is more than a preset time interval, and
wherein the determining whether the transmitted response message satisfies the preset second condition includes determining whether a difference between a transmission time and a reception time of the response message is more than a preset time interval.

7. The method of claim 6, wherein the determining whether the transmitted request message satisfies the preset first condition further includes determining whether to process a control command corresponding to the contents of the request message, according to whether the difference between the transmission time and the reception time of the request message is less than the preset time interval.

8. The method of claim 1, wherein the determining whether the transmitted request message satisfies the preset first condition includes determining whether the request message is repeatedly received or not, and
wherein the determining whether the transmitted response message satisfies the preset second condition includes determining whether the response message is repeatedly received or not.

9. The method of claim 8, wherein in the determining whether the request message is repeatedly received or not, the index information of the received request message is compared with index information pre-generated before the request message is received.

* * * * *